Dec. 14, 1971  J. GUILLOT  3,626,693
DEVICE TO ENSURE LUBRICATION, REGULATION AND
RELIABILITY OF OPERATION OF GAS TURBINES
Filed Nov. 20, 1969  4 Sheets-Sheet 4

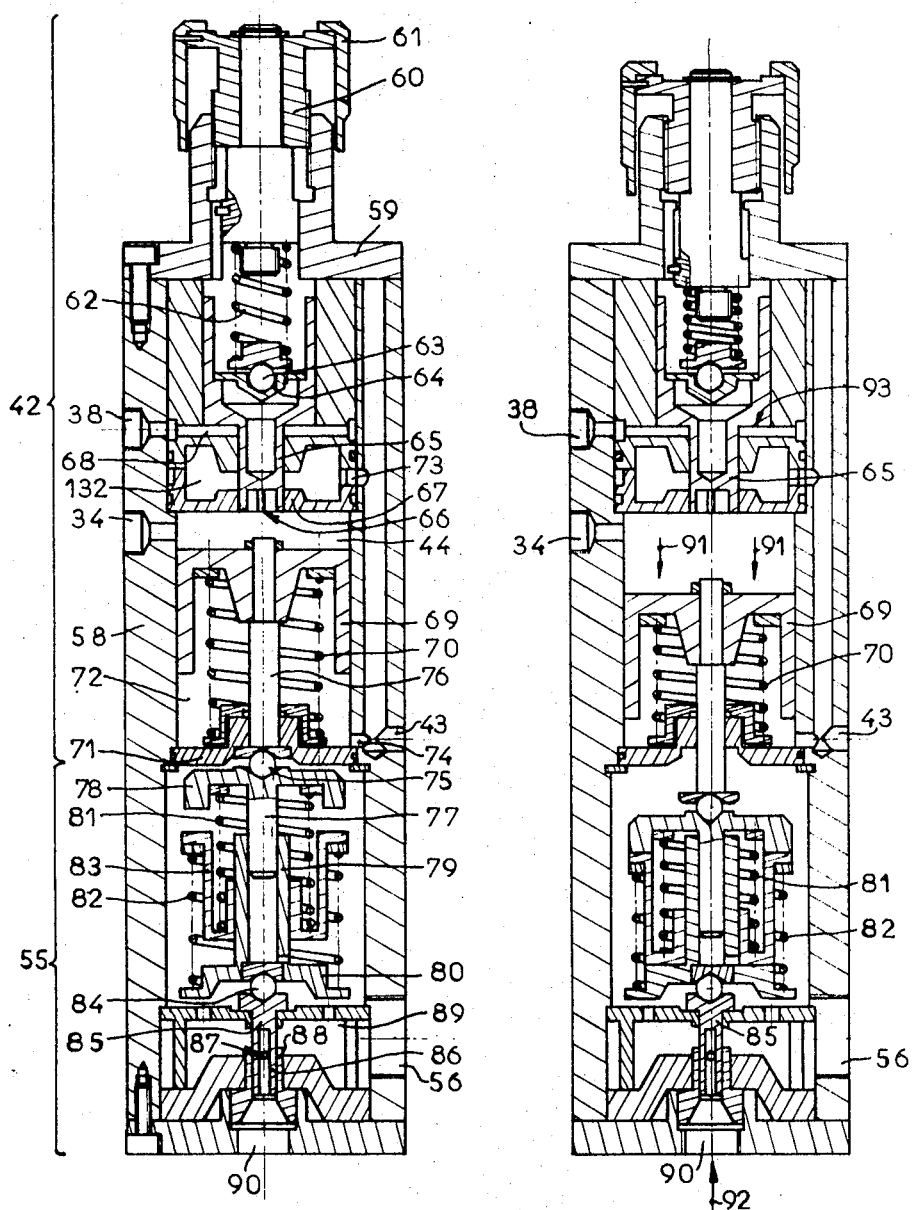

United States Patent Office 3,626,693
Patented Dec. 14, 1971

3,626,693
DEVICE TO ENSURE LUBRICATION, REGULATION AND RELIABILITY OF OPERATION OF GAS TURBINES
Jack Guillot, Tour, 20 Rue Maurice Audin,
Blanc-Mesnil, Seine-Saint-Denis, France
Filed Nov. 20, 1969, Ser. No. 878,485
Claims priority, application France, Nov. 28, 1968,
50,689
Int. Cl. F02c 9/04, 9/06, 9/10
U.S. Cl. 60—39.28
6 Claims

ABSTRACT OF THE DISCLOSURE

A gas turbine, in addition to being provided with a mechanically operated lubricating pump and an auxiliary electrically operated lubricating pump in parallel, is provided with an additional mechanical pump for supplying oil to a regulating circuit. The regulating circuit is comprised of two branches, one of which contains oil the pressure of which is controlled by a tachometric detector and the other of which contains oil, the pressure of which is modulated. Both branches combine to actuate a regulator which in turn controls a valve for controlling the flow of fuel to the combustion chambers.

---

The present invention relates to a device used in a gas turbine so as to ensure the lubrication, regulation and reliability of functioning thereof.

Gas turbines comprising one or more shafts rotating at very high speeds are known. The thermal working conditions of such a turbine are very severe and they necessitate a permanent control. The problems of regulation, lubrication and function reliability with result therefrom are particularly important in the case of a gas turbine comprising two distinct shafts, a primary shaft on which is fixed the rotor of a centrifugal compressor and a high pressure turbine rotor, with a secondary shaft carrying the rotor of a low pressure turbine which supplies the mechanical power output of the turbine.

The present invention relates to an improved device or regulating means capable of ensuring the lubrication, regulation and reliability of operation of a gas turbine of this type.

According to a preferred embodiment, an electromagnetic valve is placed close to each jet first to improve the re-starting time of the machine after a stop, and second to minimize the unburnt fuel after this stop.

The device acts not only to effect regulation, lubrication and reliability of action, but also to effect simple and reliable starting of the turbine. The operator has only to press the starter button; the turbine starts at low speed, after which it runs up to a predetermined speed set on a regulator. This system, therefore, is particularly useful for a gas turbine driving a lorry or like vehicle, the starting command being effected by the driver from his cabin.

Reference should now be made to the accompanying drawings in which:

FIG. 2 is an axial section of the regular, set to produce a slow speed.

FIG. 3 is a similar section, with the regulator set at full speed.

Figure 1:
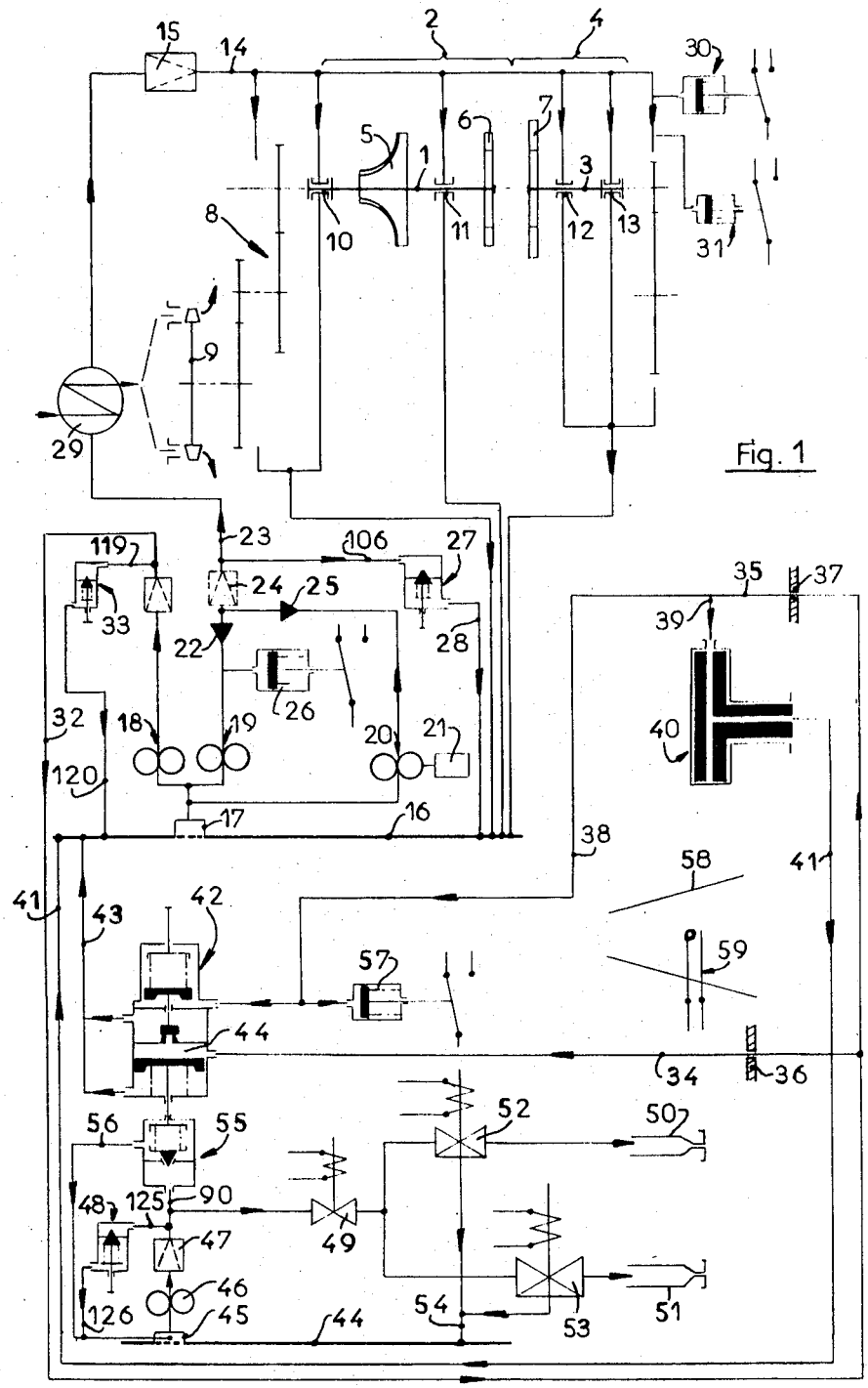
FIG. 1 is a schematic view of the whole of the regulating, lubricating and reliability device according to the invention.

FIG. 1 shows a schematic representation of a regulation, lubricating and reliability system according to the invention, this system being destined to equip a gas turbine which comprises a primary shaft 1 of a gas generator 2, and a secondary shaft 3 of a power stage 4. On the primary shaft 1 are mounted the rotor 5 of a centrifugal compressor and the rotor 6 of a high pressure turbine. The rotor 7 of a low pressure turbine is mounted on a shaft 3. The primary shaft 1 enters a casing for the mechanism 8 which rotates a fan 9 and the three pumps of the different circuits.

(1) LUBRICATION CIRCUIT

The lubrication circuit feeds the bearings such as 10, 11, 12, 13 of the turbine in parallel by means of a principle channel 14. This channel receives the oil through a filter 15. Downstream of the bearings 10, 11, 12, 13 the lubricating oil returns to a tank which is schematically shown by the horizontal line 16. Through an intake 17, the oil is taken up from this tank 16 by three pumps 18, 19 and 20. The pumps 18 and 19 are mechanically driven by the mechanism 8, whilst the pump 20 is driven by an independent electric motor 21. This electro-pump 20 is provided to ensure lubrication during the starting phase of the turbine, before the pump 19 has had time to become fully effective.

The pump 19 provides the main oil supply via a non-return valve 22; it sends oil into the channel 23 via a filter 24. The pump 20 also discharges into the filter 24 through a non-return valve 25.

On the discharge side of the pump 19, downstream of of the non-return valve 22, a pressure actuated cut off 26 is mounted in such a manner as to automatically cause the stoppage of the motor 21 of the pump 20 when the output oil pressure of the pump 19 reaches a predetermined value.

Figure 5:
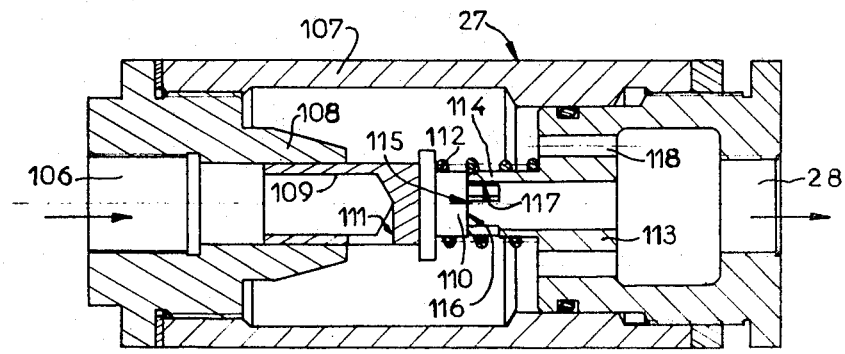
FIG. 5 is an axial section of the discharge valve of the lubricating oil circuit.

Dowstream of the filter 24, there is a relief-valve 27 acting as a by-pass to the channel 23: details of the valve are shown in FIG. 5. This valve 27 (FIG. 1) opens when the oil pressure in the channel 23 exceeds the predetermined value, the surplus oil being then returned to the tank 16 by a channel 28.

The channel 23 passes the oil into an air cooler 29 through which the air circulation is caused by the fan 9. The oil thus cooled passes through the filter 15, then into a lubrication channel 14.

This channel 14 is provided with lubrication indicator 30, and reliability indicator 31, mounted in parallel on the bearings 10, 11, 12, 13.

During the beginning of the starting-up phase of the turbine, the lubrication distributor 14 is fed by the electro-pump 20, 21 which cuts out when the mechanical pump 19 provides sufficient oil pressure.

The motor pump 20, 21 is also provided to supply the oil circuit 23, 14 during any breakdown of the pump 19 (this fault bringing about the stoppage of the apparatus). The electro-pump 20, 21 also provides adequate lubrication of the low pressure shaft 12, 13 which, in numerous applications, can have a slowing-down time much longer than the high pressure shaft 10, 11.

(2) REGULATION

The regulation arrangement shown in FIG. 1 ensures that the turbine works at constant speed. It may drive an alternator, or the gearing on certain special vehicles.

The regulation is effected partly by a lubricating oil circuit and partly by a fuel oil circuit.

(A) Actuating oil circuit

Figure 6:
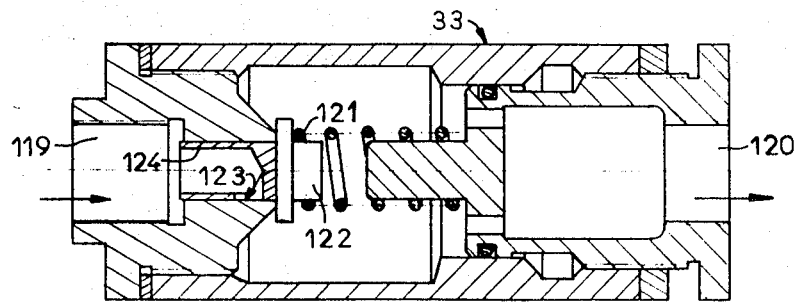
FIG. 6 is an axial section of the discharge valve of the actuating oil circuit.

The pump 18 discharges oil into a channel 32 on which is mounted in parallel a pressure limiting valve 33. Details of this valve are shown in FIG. 6.

The channel 32 feeds two channels 34 and 35 in parallel each of which is provided with a calibrated constriction 36 or 37. In its turn the channel 35 splits into two channels 38 and 39. The channel 39 feeds a tachometric detector 40 mounted on the low pressure turbine shaft. This tachometric detector 40 produces a pressure substantially proportional to the square of the speed of rotation of the said turbine. This pressure is applied to the channels 38 and 39. The oil discharge from the the detector, a function of the speed, is returned to the tank by a channel 41.

The channel 38 is connected to a regulator 42 of which the details are shown in FIGS. 2 and 3. The channel 34, fed by the calibrated orifice 36 and also connected to this regulator, contains oil of which the pressure is governed by a discharge through the regulator chamber 44. This surplus discharge is returned to the tank 16 by the channel 43.

(B) Fuel circuit

The fuel is contained in a fuel tank 44. It is drawn through intake 45 by a pump 46 which discharges through a filter 47. At the exit of this filter 47 are mounted in parallel—

Figure 7:
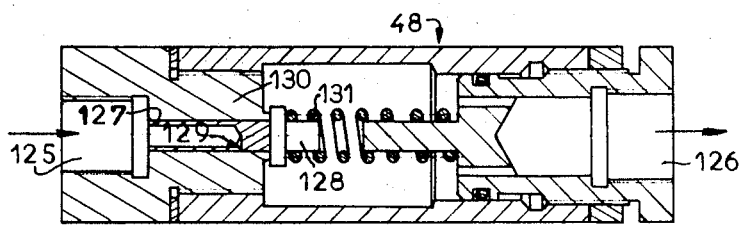
FIG. 7 is an axial section of the discharge valve of the fuel oil circuit.

A pressure limiting valve 48 of which the detail is shown in FIG. 7 and which returns to the intake 45 the surplus fuel from the pump 46;

A valve 49 which distributes the fuel to the jets 50 and 51 of the combustion chambers, these jets both being connected in parallel, each being supplied via a three-way electro-magnetic valve 52 or 53 capable of returning excess fuel to the tank 44, through a common channel 54; these three-way electro-magnetic valves being designed to eliminate any air lock downstream during the starting phase;

A stop valve 55 which, controlled by the regulator 42, causes a controlled discharge on the fuel circuit, which returns to the intake 45 by a channel 56.

The valve 49 can be manually or automatically controlled. It provides an emergency stop of the turbine, in the case of improper functioning of the valves 52 and 53.

As a by-pass, there is a relief valve 57 on channel 38, to prevent overspeeding; it operates if the speed of the low pressure turbine 3, 7 exceeds a predetermined value. Finally, in the exhaust 58 of the turbine there is an excessive temperature detector 59 of known type.

(C) Differential regulator valve 42 and stop valve 55

These two parts are incorporated in the same apparatus (FIGS. 2 and 3). A body 58 is provided at its top with a cover 59 on which there is screwed the threaded tubular casing 60 of a speed control button 61. By screwing this button it is possible to vary the compression of a spring 62 which, by the intermediary of a central ball 63 and seating 64 acts on a cylindrical slide valve 65. This latter is provided with four longitudinal slits 66 which more or less uncover an escape channel according to the axial position of this slide valve 65 with respect to a fixed seat 67 at the center of which it slides. The amplitude of the displacements of the slide valve 65 remains very small. Two side channels ensure the connection of the regulated oil 33 with the upper chamber 68 of the regulator, and of the controlled oil channel 34 with the chamber 44.

A piston 69 slides in the lower part of the chamber 44 which a compression spring 70 tends to push back in the opposite direction against the modulated pressure in this chamber 44. This spring 70 is supported on a transverse fixed partition 71. The chamber 72 is connected to a chamber 132 and thence to the return channel 43. Communication is effected by the lateral bore holes 73 and 74. By means of a ball 75, the shaft 76 of the piston 69 acts on another sliding shaft 77 integral with a cap 78. The shaft 77 slides in a groove 79 of which the lower extremity is in its turn integral with a cap 80. Between the caps 78 and 80 are two concentric compression springs 81 and 82 having different flexibilities, these springs 81 and 82 supported one on the other by an intermediary collar 83.

At its base, at the center of the cap 80, the sleeve 79 acts by a thrust ball bearing 84 on a regulator valve 85. This latter comprises a cylindrical skirt 86 having small orifices 87 bored therein, creating a variable leakage according to whether the position of the piston 85 brings them more or less above a fixed seat 88.

Above this seat 88 is a chamber 89 which communicates with the leakage channel 56. Channel 90 extends through a plate which is connected to the body 58 under the seat 88 and receives fuel from the fuel pump 46 (FIGS. 1 and 2).

The start of the fuel circuit feeding the jets 50 and 51 of the combustion chambers is effected during starting up of the turbine, by the pump 46. The jets 50 and 51 always ensure good atomisation of the fuel. Because of this, regulation of the rate of flow of fuel in the jets 50 and 51 is obtained by direct variation of the feed pressure. This variation of pressure is effected by the regulator 42 and the variable stop valve 55. This apparatus (FIGS. 2 and 3) is pre-adjusted so as at the start to limit the pressure of the circuit to a value of approximately seven bars (80 lb./sq. in.) which is the minimum value necessary for correct burning of the fuel in the combustion chamber.

The regulation shown in the drawings provides maintenance of a constant speed of the driven shaft 3, within predetermined limits, whatever may be the lead variation. The speed can be adjusted to any desired figure.

The speed controlling element is the tachometer regulator valve 40 which produces, in the channel 38, an oil pressure proportional to the square of the speed of the turbine 3, 7. The increase of the speed of the high pressure turbine 1, 6 and, in consequence, that of the low pressure turbine 3, 7, is achieved by action on the fuel pressure regulator 42. This action is accompanied by the progressive compression of the spring 62 if the button 61 (FIG. 3) is turned. Thus, the beginning of the discharge of modulated oil from the chamber 44 is limited, by discharge through the calibrated hole 66. This limitation of the discharge through the slots 66 of the slide valve 65 causes an increase in pressure in the chamber 44 and depression of the piston 69 (arrows 91) which, in its turn, successively compresses one of the two pairs of springs 70 and 81, then 70 and 82. The pressure of these springs on piston 85 is opposite to the fuel pressure in the channel 90 (arrow 92). This action has the effect of limiting the fuel discharge through the orifices 87, from the channel 90 up to the return channel 56. The result is an increase of the feed pressure to the jets 50 and 51, and, similarly, an increase in the speed of the two shafts 1 and 3. During the increase in speed, the spring 62 must balance in the first place the action of the modulated oil pressure on the end of the slide valve 65, and in the second place the action of the regulated oil pressure on the section 93 of the base of this slide valve 65. As soon as the low pressure shaft 3 reaches the selected speed, the action on the spring 62 ceases, and the apparatus stabilizes in the "no lead" state.

If the lead begins to increase, the speed of the low pressure shaft 3 falls slightly, this variation of the normal working condition shows by a diminution of the regulated pressure in the channel 38, this diminution causing the movement of the slide valve 65 and an increase in the modulated oil pressure in the chamber 44 followed by an increase of the fuel flow into the jets 50 and 51.

After a lessening of the lead, the regulator 42 resets in the opposite manner.

(D) Accessories of the regulation circuit

Figure 4:
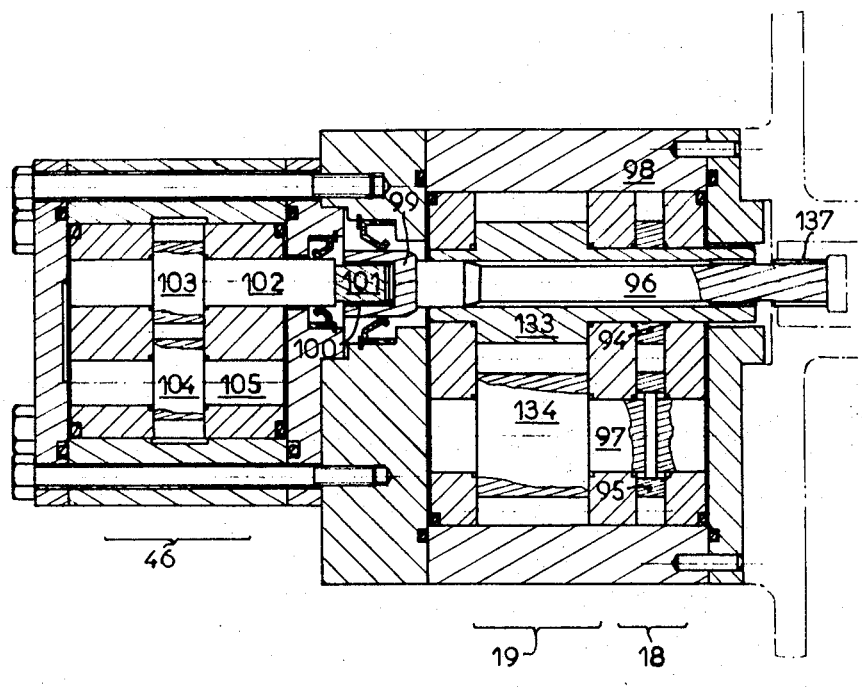
FIG. 4 is an axial section of the triple pump which is used to feed the fuel circuit, the motive oil circuit of the regulator and the lubricating oil circuit.

FIG. 4 shows an assembly which includes the fuel pump 46, the power oil pump 18 and the lubricating pump 19. For this, an oil pump 18 is used which comprises two gears 94 and 95 on two shafts 96 and 97. Two other gears 133 and 134 carried by these same shafts constitute the lubricating pump 19. The driving shaft 96 and keyways 137 on one end which extends out of the housing 98. At its other end, the shaft 96 is terminated by a sleeve 99 having internal keyways 100 in which the keyed end 101 of a shaft 102 fits. This latter forms the driving shaft of the fuel pump 46 and it drives a gear 103, which engages with another gear 104 on shaft 105. The two driving shafts 96 and 102 are thus disposed coaxially. The assembly of the three pumps 18, 19 and 46 is a compact unit.

FIG. 5 shows details of the discharge valve 27 of the lubricating oil circuit. The oil inlet channel 106 is connected to one of the ends of the body 107 of this apparatus, whilst at the other end it connects to the return channel 28. Close to the end of the channel 106 is a fixed cylindrical seat 108 in which slides the hollow cylindrical skirt 109 of a valve 110. This skirt is provided with a large lateral opening 111 which remains masked by the internal cylindrical shell of the seat 108 when the valve 110 is closed, as illustrated in FIG. 5. A compression spring 112 tends to maintain the valve 110 upon its seat 108. This spring 112 is supported by a transverse fixed partition 13 integral with a hollow central sleeve 114. The face 115 of this sleeve 114 receives the thrust of the upper face 116 of the valve 110 to limit the lifting amplitude of this latter with respect to its seat 108. Notches 117 are cut out on the sleeve 114, next to the face 115. Finally, the longitudinal bore holes 118 pass through the partition 113 around the sleeve 114.

It is to be understood that if the pressure in the channel 106 does not exceed a threshold fixed by the calibration of the spring 112, the valve 110 remains closed (FIG. 5), and the opening 111 is blocked. Thus no discharge of oil takes place via the channel 28.

If the pressure in the channel 106 exceeds the predetermined threshold, it compresses the spring 112 and raises the valve 110. The seat 108 and skirt 109 act as a slide valve which controls the effective size of the lateral opening 111. The oil escapes through the interior of the sleeve 114 and by the bore holes 118, to channel 28. When the pressure has been lowered below the threshold in question, the valve 110 recloses.

FIG. 6 shows details of a pressure limiting valve 33 which is in the drive oil circuit of the regulator. This valve receives oil through a channel 119 and returns it to the tank 16 by channel 120. Its method of construction is analogous to that of the suppression valve 27. The differences result simply from the calibration of its spring 121 and the dimensions of its valve part 122 and the diameter of the lateral opening 123 of its cylindrical skirt 124.

FIG. 7 shows the details of a pressure limiter 48 in the fuel circuit. The method of construction of this limiter is analogous to that of the apparatus shown in FIGS. 5 and 6. It receives the fuel from the filter 47 through a channel 125 and it overflows toward the intake 45 through a return channel 126. The main difference is that this valve is smaller, since the fuel discharge rate is much smaller than the discharges of oil passing through the valves 27 or 33. In particular a small diameter is chosen for the skirt 127 of valve 128, as well as for the lateral opening 129 of this skirt. Retention of the valve 128 on its fixed seat 130 is ensured by a spring 131.

What is claimed is:

1. Device for lubrication, regulation and safety of a gas turbine, characterised by comprising in combination: a mechanically operated pump (19) for lubricating oil and an auxiliary electrically operated lubrication pump (20) in parallel with the lubricating oil pump (19) for the starting-up and slowing-down phases of the gas turbine, a mechanically operated fuel pump (46), a mechanically operated pump (18) for the actuating oil of the regulating circuit wherein a main feed channel (32) splits into a channel (35), (38) containing oil the pressure of which is controlled by a tachometric detector (40), and into a channel (34) containing oil the pressure of which is modulated, both oil channels (34) and (38) actuating a regulator (42) which opens or closes a stop valve (55) mounted on the fuel circuit.

2. Device according to claim 1, characterised in that the variable stop valve (55) regulating the rotation speed of the gas turbine is mounted downstream of the fuel pump (46), in parallel with the jets (50) and (51) of the combustion chambers, in order to control the amount of a fuel discharge from the fuel circuit.

3. Device according to claim 1, characterised in that the regulated oil pressure within the channel (38) is substantially proportional to the square of the speed of rotation of the power shaft (3) of the gas turbine, this variation being controlled by the tachometric detector (40).

4. Device according to claim 1, characterised in that the regulator (42) and the stop valve (55) are incorporated in the same apparatus having a body (58) provided at one end with a screw threaded button (61) to vary the rotation speed by compression of a spring (62) acting on a slide valve (65) with end slits (66) through a fixed seat (67) more or less uncovering a controlled oil discharge between the modulated oil channel (34) and a chamber (132) which opens into the return oil channel (74) when the regulated oil pressure within the channel (38) actuating a section (93) of the slide valve base (65) overcomes the force of the adjustment spring (62), whilst the modulated oil pressure within the chamber (44) actuates a piston (69) against a spring (70) supported on a fixed partition (71), said piston (69) having its shaft (76) to act a system of springs (81), (82) with double flexibility for moving a small axial distributor piston (85) sliding fluid-tightly through a fixed seat (88) against the calibrated fuel feed pressure within the outlet channel (90) of the fuel pump (46), the cylindrical hollow skirt (86) of this piston (85) having in addition a number of orifices (87) creating a varaible leakage towards a chamber (89) above the seat (87) opposite to the feed channel (90), this chamber (89) being connected to the fuel return channel (56).

5. Device according to claim 1, characterised in that in each of the three lubrication, regulation and safety circuits is interconnected a relief-valve (27), (33), (48) comprising a liquid inlet (106), (119), (125) arriving at the center of a fixed seat (108) or (130) within which slides fliud-tightly the hollow cylindrical skirt (109), (124), (127) of a valve (110), (122), (128), this skirt being provided with a wide lateral opening (111), (123), (129) which remains masked by the internal cylindrical shell of the seat (108), (130) when the valve (110) is closed by action of a return spring (112), (121), (131) supported by a fixed transverse partition (113) provided with a thrust sleeve (114) to limit the lifting amplitude of the valve (110), (122), (128) when the opening (111), (123), (129) is opened, the chamber (150), (151), (152) surrounding the spring and the valve being in addition directly connected to the return channel (28), (120), (126) of the liquid.

6. Device according to claim 1, characterised in that the regulation oil pump (18), the lubrication oil pump (19) and the fuel pump (46) are incorporated in the same casing driven by a shaft (96) directly fixed to the driving gear (94) of the regulation oil pump, then to the driving gear (133) of the lubrication oil pump, whilst at its other end this shaft (96) is connected by a sleeve and keyways system (99), (100), (101) with another aligned shaft (102) fixed to the driving gear (103) of the fuel pump (46).

References Cited

UNITED STATES PATENTS

| 2,402,467 | 6/1946 | Thompson | 60—39.08 X |
| 2,711,071 | 6/1955 | Frankel | 60—39.08 X |
| 2,751,749 | 6/1956 | Newcomb | 60—39.08 |
| 2,880,673 | 4/1959 | Soderberg | 184—6 X |
| 2,894,521 | 7/1959 | Carleton | 415—17 |
| 3,325,994 | 6/1967 | Zaba | 60—39.28 X |
| 3,342,196 | 9/1967 | Przybylko | 60—39.28 X |

CLARENCE R. GORDON, Primary Examiner

U.S. Cl. X.R.

123—196; 415—111; 60—39.08, 39.14, 39.16; 184—6